US008180942B2

(12) United States Patent
Chen

(10) Patent No.: US 8,180,942 B2
(45) Date of Patent: May 15, 2012

(54) ARBITRATION DEVICE AND METHOD

(75) Inventor: Yi-Chou Chen, Chiayi County (TW)

(73) Assignee: Realtek Semiconductor Corp., Hsinchu (TW)

( * ) Notice: Subject to any disclaimer, the term of this patent is extended or adjusted under 35 U.S.C. 154(b) by 38 days.

(21) Appl. No.: 12/358,975

(22) Filed: Jan. 23, 2009

(65) Prior Publication Data

US 2009/0193167 A1 Jul. 30, 2009

(30) Foreign Application Priority Data

Jan. 25, 2008 (TW) .............................. 97102860 A

(51) Int. Cl.
*G06F 13/14* (2006.01)
*G09G 5/39* (2006.01)
*G09G 5/36* (2006.01)
*G09G 5/00* (2006.01)

(52) U.S. Cl. ......... 710/244; 345/531; 345/545; 345/637

(58) Field of Classification Search .................. 710/244; 345/531, 545, 637
See application file for complete search history.

(56) References Cited

U.S. PATENT DOCUMENTS 4,878,173 A * 10/1989 Goekjian ........................ 710/22
5,761,714 A * 6/1998 Liu et al. ........................ 711/127
5,864,557 A * 1/1999 Lyons ........................... 370/444
6,088,772 A * 7/2000 Harriman et al. ............. 711/158
6,384,846 B1 * 5/2002 Hiroi ............................ 715/794
6,816,923 B1 * 11/2004 Gray et al. ...................... 710/25
6,891,536 B2 * 5/2005 Smith ........................... 345/421
6,956,585 B2 * 10/2005 Muraki et al. ................ 345/629
7,062,582 B1 * 6/2006 Chowdhuri ................... 710/116
7,266,254 B2 * 9/2007 Ishikawa et al. .............. 382/305
7,447,805 B2 * 11/2008 Braun et al. ...................... 710/5
7,576,757 B2 * 8/2009 Kariathungal et al. ....... 345/637
7,728,850 B2 * 6/2010 Kobayashi .................... 345/629
7,830,794 B2 * 11/2010 Jutzi ............................ 370/230
2002/0150304 A1 * 10/2002 Ockman ....................... 382/260
2003/0113037 A1 * 6/2003 Yoda ............................ 382/302
2005/0062745 A1 * 3/2005 Amemiya et al. ............ 345/501
2005/0066093 A1 * 3/2005 Fuchikami et al. ........... 710/107
2005/0080942 A1 * 4/2005 Ogilvie et al. .................. 710/22
2005/0135397 A1 * 6/2005 Hoban et al. .................. 370/428
2006/0082586 A1 * 4/2006 Noorbakhsh et al. ......... 345/535
2008/0010540 A1 * 1/2008 Nagashima ..................... 714/38
2008/0112012 A1 * 5/2008 Yokoyama et al. .......... 358/3.03

* cited by examiner

*Primary Examiner* — Paul R Myers
*Assistant Examiner* — Christopher a Daley
(74) *Attorney, Agent, or Firm* — Thomas, Kayden, Horstemeyer & Risley, LLP

(57) ABSTRACT

An arbitration device receives a plurality of requests from a plurality of circuits, and grants access to one of the plurality of circuits. The arbitration device includes a sorter and an arbitrator. The sorter receives position information of an image signal including a plurality of image layers, and determines an access priority including a first group and a second group according to the position information. The arbitrator receives the access priority and at least one of the plurality of requests, and grants the access to one of the plurality of circuits according to the access priority and the at least one of the plurality of requests. In addition, each of the plurality of circuits generates data for each of the image layers correspondingly.

20 Claims, 3 Drawing Sheets

ARBITRATION DEVICE AND METHOD

CROSS-REFERENCE TO RELATED APPLICATION

This application claims priority of Taiwanese application no. 097102860, filed on Jan. 25, 2008.

BACKGROUND OF THE INVENTION

1. Field of the Invention

The invention relates to an arbitration device and method, more particularly to an arbitration device and method with a dynamic priority mechanism.

2. Description of the Related Art

With the advancement of imaging information systems, a blend of image layers, such as picture in picture (PIP), on screen display (OSD), caption, cursor, background image, etc., is often presented on a screen. For a real-time playback system, prior to display on a screen, it is necessary to retrieve and suitably process data of all image layers to be presented on the screen before they can be blended in sequence. Since the data of each image layer is normally large, the system is built with large-capacity registers for storing the data of the image layers, which is not economical. In a more economical approach, data of an image layer to be presented is processed immediately upon acquisition for real-time display. Therefore, during the process of playback, data retrieval, processing and display are parallel-processed. However, in such a parallel-processing scheme, while data of each image layer must be retrieved for processing, use of a shared data bus necessitates the grant of only one data access request associated with one of the image layers at a time. As a result, an arbitration issue with regard to data access requests among the image layers arises.

At present, there are a number of arbitration schemes known in the art, such as a fixed-priority scheme, a round-robin scheme, a weighted round-robin scheme, etc. Nevertheless, when faced with a wide variety of display applications, any specific arbitration scheme is not suited for application as a universally optimal design. For instance, on a screen with video images and text captions, the position of the text captions may overlie the video images (in this case, the text captions must is be retrieved earlier than the video images), or the position of the text captions may underlie the video images (in this case, the text captions must be retrieved later than the video images).

The aforementioned conventional arbitration schemes have their inherent disadvantages. For example, when data of an image layer that should be retrieved earlier (such as data to be presented on an overlying position of a screen) is actually retrieved later than data of other image layers (such as data to be presented on an underlying position of the screen), the data of the other image layers will be stored in a register for an undesirably longer period of time. As a result, it is needed to configure larger-capacity registers in the system to ensure sufficient data amounts for real-time playback. Inability to retrieve required data immediately has an adverse affect on real-time playback. Moreover, the longer the time data is required to be stored in a register, the larger will be the required capacity of the register. It is noted that each image layer is associated with a corresponding register. Therefore, when the number of image layers is large, the required number of registers will be large as well.

It is apparent from the foregoing that the conventional arbitration schemes require large-capacity buffers to minimize any adverse influence on real-time screen display and to ensure playback continuity. Consequently, circuit size and costs are increased when the conventional arbitration schemes are in use, which is not very cost-effective.

SUMMARY OF THE INVENTION

Therefore, an object of the present invention is to provide an arbitration device and method that can overcome the aforesaid drawbacks associated with the prior art.

According to one aspect of the present invention, there is provided an arbitration device adapted for receiving a plurality of requests from a plurality of circuits, and for granting access to one of the plurality of circuits. The arbitration device comprises a sorter and an arbitrator. The sorter receives position information of an image signal comprising a plurality of image layers and determines an access priority comprising a first group and a second group according to the position information. The arbitrator receives the access priority and at least one of the plurality of requests, and grants the access to one of the plurality of circuits according to the access priority and the at least one of the plurality of requests. In addition, each of the plurality of circuits generates data for each of the image layers correspondingly.

According to another aspect of the present invention, there is provided a method for granting access to one of a plurality of circuits that issue a plurality of requests, respectively. The method comprises the steps of: receiving position information of an image signal; determining a priority for each of the plurality of requests according to the position information; and granting the access to one of the plurality of circuits according to at least one of the plurality of requests and the priority, wherein the priority comprises a plurality of groups.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
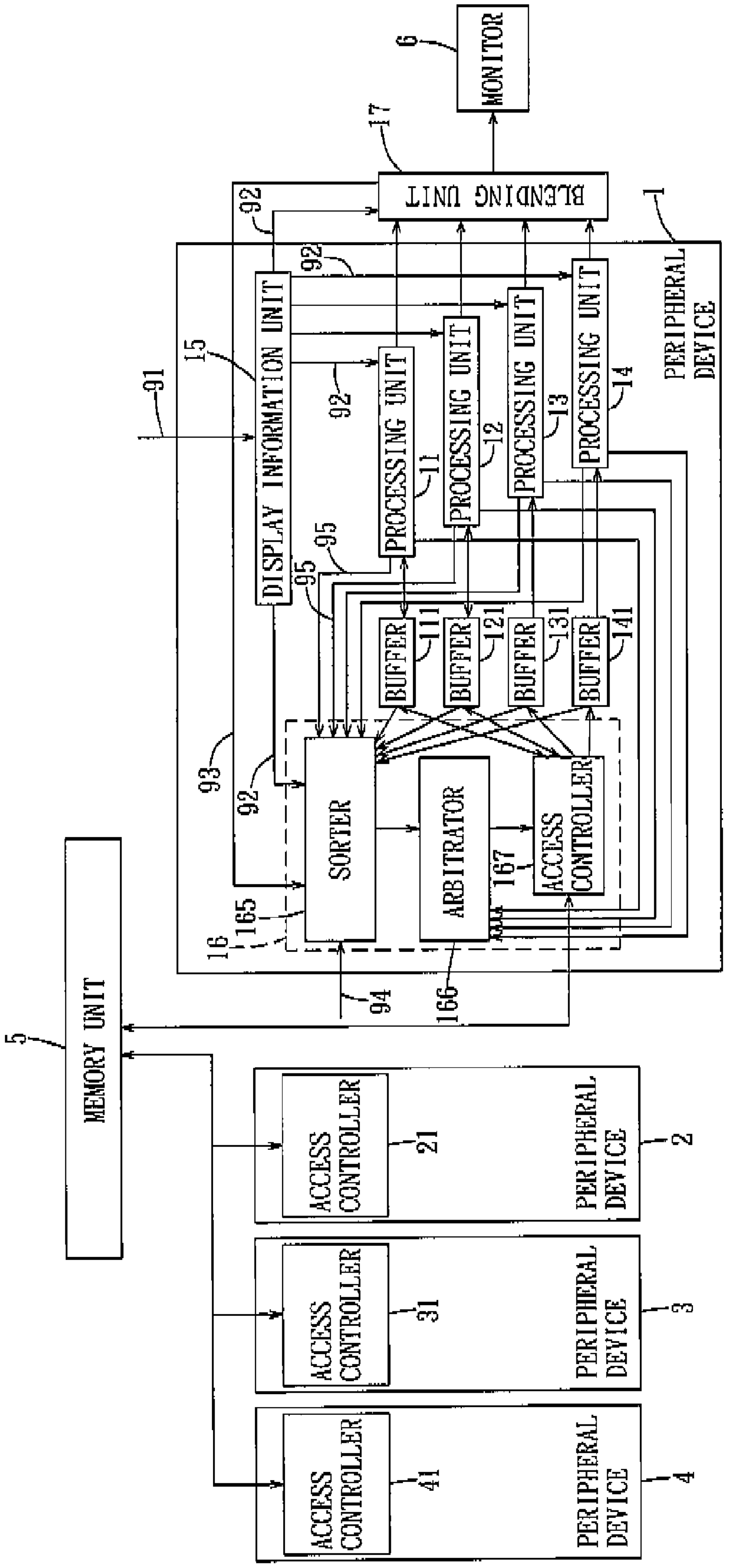
FIG. 1 is a block diagram of the preferred embodiment of an arbitration device according to the present invention.
Figure 2:
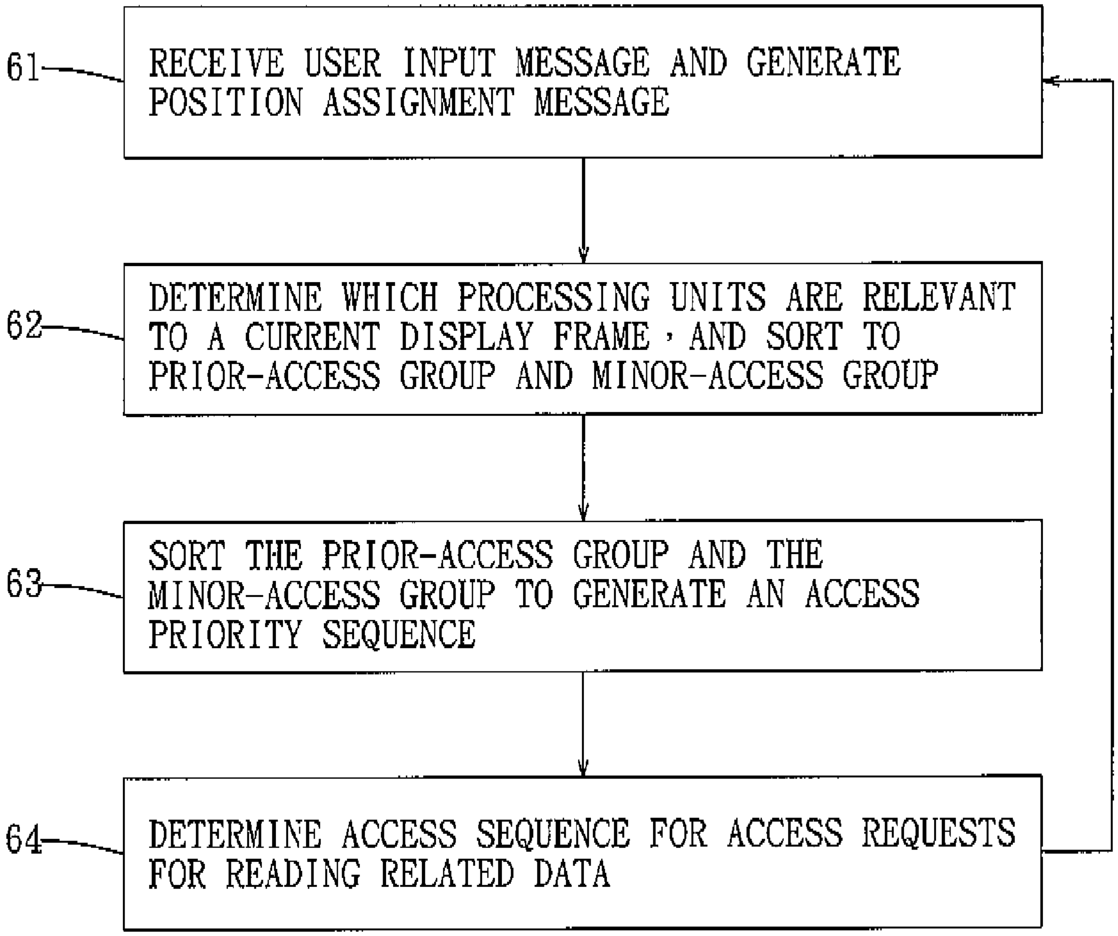
FIG. 2 is a flowchart of the preferred embodiment of an arbitration method according to the present invention.
Figure 3:
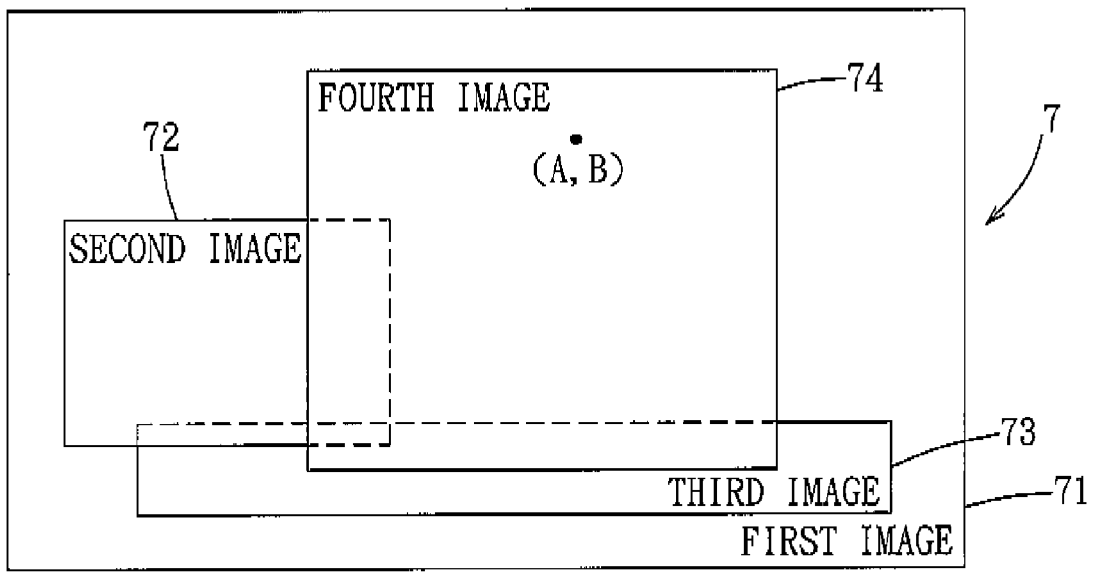
FIG. 3 is a schematic diagram of a sample display screen for illustrating operation of the preferred embodiment.

Referring to FIGS. 1 to 3, the preferred embodiment of an arbitration device 16 according to the present invention is shown to be adapted for use in a peripheral device 1. The peripheral device 1 is coupled to a memory unit 5 and a monitor 6. The memory unit 5 is further coupled to other peripheral devices 2, 3, 4. The memory unit 5 can include a DDR, but is not limited in this aspect. The peripheral device 1 can be a multimedia chip, and the peripheral devices 2, 3, 4 can be a MPEG decoder, a video signal decoder, or an optical disc player. Each of the peripheral devices 2, 3, 4 has a respective access controller 21, 31, 41.

Aside from the arbitration device 16, the peripheral device 1 further includes a display information unit 15, a plurality of circuits (in this embodiment, the circuits include processing units 11, 12, 13, 14, wherein the processing unit 11 may be one used for processing text captions, the processing unit 12 may be one used for processing a cursor, etc.), a blending unit 17, and a plurality of buffers 111, 121, 131, 141, each of which corresponds to a respective one of the processing units 11, 12, 13, 14.

The arbitration device 16 includes a sorter 165, an arbitrator 166, and an access controller 167. The blending unit 17 sends blending coordinate messages 93 to the sorter 165 so that the arbitration device 16 is aware of positions being processed on a current display frame 7 of the monitor 6. For instance, the coordinate (M,N) stands for a position at row (M) and column (N). In this embodiment, the access Controllers 21, 31, 41, 167 are direct memory access (DNA) controllers, but are not limited thereto in practice.

It is assumed in the following that the peripheral device 1 is a multimedia chip, and the peripheral devices 2, 3, 4 are a MPEG decoder, a first video signal decoder and a second video signal decoder, respectively. Further, it is assumed that the memory unit 5 has OSD data pre-stored therein, and the display frame 7 is that shown in FIG. 3. Moreover, the processing units 11, 12, 13, 14 receive data from the MPEG decoder 2, the first video signal decoder 3 and the second video signal decoder 4, as well as the OSD data, through the buffers 111, 121, 131, 141, respectively, and correspond to a first image 71, a second image 72, a third image 73 and a fourth image 74 on the display frame 7, respectively.

Referring to FIG. 2, the preferred embodiment of an arbitration method according to the present invention comprises the following steps:

step 61: The display information unit 15 receives a user input message 91, and generates a position assignment message 92 that is transmitted to the sorter 165, the blending unit 17 and the processing units 11, 12, 13, 14. The position assignment message 92 indicates assignments of outputs of the processing units 11, 12, 13, 14 on the display frame 7.

step 62: The sorter 165 receives a frame-position signal that includes the position assignment message 92 and the blending coordinate message 93. The sorter 165 determines position assignments of the various image layers included in the display frame 7 with reference to the position assignment message 92, and which computations of the processing units 11, 12, 13, 14 are relevant to the current display frame 7 with reference to the blending coordinate message 93 (i.e., coordinate information). The sorter 165 then sorts the access requests issued by those processing units 11, 12, 13, 14 relevant to the current display frame 7 to a prior-access group having a higher access priority, and the access requests issued by the other processing units 11, 12, 13, 14 to a minor-access group having a lower access priority, wherein the access requests in the prior-access group have higher order priority than those in the minor-access group. Moreover, the sorter 165 treats data consumption speeds 95 of data being processed by the processing units 11, 12, 13, 14 as data amount information. The sorter 165 then performs ordering of the access requests according to the data replenishing status of the buffers 111, 112, 113, 114 and the corresponding data consumption speeds 95. It should be noted that, in other embodiments of the invention, assignment of highest order priority or any other order priority to access requests from the processing units 11, 12, 13, 14 in the prior-access group can vary depending on actual use conditions.

step 63: The sorter 165 sorts the prior-access group and the minor-access group to generate an access priority sequence.

step 64: The arbitrator 166 receives the access priority sequence and the access requests issued by the processing units 11, 12, 13, 14, and determines an access sequence for the access requests. According to the access sequence, the access controller 167 then retrieves data from the memory unit 5 for storage in the corresponding buffers 111, 121, 131, 141. Thereafter, the blending unit 17 performs blending of the outputs of the processing units 11, 12, 13, 14 according to the position assignment message 92 so as to generate the display frame 7. Finally, steps 61 to 64 are repeated until the peripheral device 1 stops data transmission.

In this embodiment, step 63 includes the following substep: The sorter 165 determines if one of the processing units 11, 12, 13, 14 is performing decompression processing and if the data amount of the buffer 111, 121, 131, 141 corresponding to the one of the processing units 11, 12, 13, 14 is smaller than a predetermined value. If affirmative, the sorter 165 assigns the highest access priority or a designated access priority to the access request issued by the one of the processing units 11, 12, 13, 14. Since the time needed for data decompression is hard to estimate, the corresponding data consumption speed 95 is also hard to estimate. Therefore, as long as the data buffer replenishing amount of the data buffer 111, 121, 131, 141 corresponding to the access request associated with decompression processing is smaller than the predetermined value, the sorter 165 assigns a higher access priority to the access request from the processing unit 11, 12, 13, 14 that performs decompression processing so as to ensure smooth screen playback. In this embodiment, the sorter 165 receives arbitration selection information message 94 and selects an arbitration scheme, such as a fixed-priority scheme, a round-robin scheme, a weighted round-robin scheme, etc., according to the arbitration selection information message 94 for use in determining the access priority sequence.

The following example is provided to describe the features of the invention. Referring to FIG. 3, it is assumed that a blending coordinate message 93 indicates position (A, B) of the display frame 7 as one that is currently being processed. Position (A, B) is within the scopes of the first image 71 and the fourth image 74. The order of the processing units 11, 12, 13, 14 when sorted in a decreasing order of data consumption speeds 95 is as follows: the processing unit 12, the processing unit 13, the processing unit 14, and the processing unit 11. While the access requests of the processing units 12, 13 are initially prioritized over the access requests of the processing units 11, 14, the sorter 165 is able to flexibly sort the access requests from the processing units 11, 14 to the prior-access group and the access requests from the processing units 12, 13 to the minor-access group. In other words, this invention dynamically and flexibly adjusts the access priority sequence of the access requests from the processing units 11, 12, 13, 14 according to the current state of screen playback, thereby achieving smooth screen playback and ensuring an optimum playback effect.

In this example, assuming that the data consumption speed 95 of the processing unit 14 is faster than that of the processing unit 11, then the access order of the access request from the processing unit 14 in the prior-access group will be higher than that of the access request from the processing unit 11.

If the processing unit 13 is performing decompression processing and the data amount of the corresponding buffer 131 is larger than the predetermined value, the access request from the processing unit 13 is sorted by the sorter 165 to be the lowest access order in the minor-access group. Therefore, the access priority sequence as determined by the sorter 165 is as follows: the access request from the processing unit 14, the access request from the processing unit 11, the access request from the processing unit 12, and the access request from the processing unit 13. On the other hand, if the processing unit 13 is performing decompression processing and the data amount of the corresponding buffer 131 is smaller than the predetermined value, the access request from the processing unit 13 is assigned by the sorter 165 to have the highest access priority. Therefore, the access priority sequence as determined by the sorter 165 is as follows: the access request from the processing unit 13, the access request from the processing unit 14, the access request from the processing unit 11, and the access request from the processing unit 12. It is noted herein that the sorter 165 can be configured to assign the access request from the processing unit 13 to have the highest access order in the minor-access group or to sort the access request from the processing unit 13 to the prior-access group in other embodiments of the invention.

It is further noted that the steps of the arbitration method of this invention need not necessarily be executed in a particular sequence, and may be rearranged and modified to cope with practical requirements. Since such rearrangement or modification can be readily appreciated by those skilled in the art, further details of the same are omitted herein for the sake of brevity. In addition, it also noted that the arbitration device 16 and the arbitration method of this invention are not limited for application to DMA technology, and are actually applicable to other technologies that require access arbitration.

In sum, the sorter 165 is capable of balancing the blending condition of the blending unit 17 and the data consumption speeds 95 of the processing units 11, 12, 13, 14, and can assign highest priority to the access request from the processing unit 11, 12, 13, 14 that performs decompression. As a result, overall data transmission efficiency can be promoted through the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An arbitration device adapted for receiving a plurality of requests from a plurality of circuits, and for granting access to one of the plurality of circuits, the arbitration device comprising:

a sorter for receiving position information of an image signal comprising a plurality of image layers, and for determining an initial access priority order according to the position information, each of the plurality of circuits generating data including the position information for each of the image layers correspondingly, wherein the sorter determines a final access priority order by adjusting the initial access priority order to accommodate at least one of data consumption speeds of each of the plurality of circuits and data buffer replenishing amounts corresponding to the plurality of requests; and an arbitrator for receiving the final access priority order and the plurality of requests, and for granting the access to one of the plurality of circuits according to the final access priority order and the at least one of the plurality of requests.

2. The arbitration device of claim 1, wherein the sorter receives a status amount signal to determine a data consumption status of the image layers, and adjusts the initial access priority order according to the data consumption.

3. The arbitration device of claim 1, wherein the position information comprises coordinate information for indicating positions of the image layers in a current display frame.

4. The arbitration device of claim 3, wherein the initial access priority order comprises a first group and a second group, and the sorter sorts the requests to the first group and the second group according to the coordinate information.

5. The arbitration device of claim 4, wherein, if at least two of the requests are sorted to the first group and the second group, the sorter assigns different access orders to the at least two of the requests in the first group and in the second group, respectively.

6. The arbitration device of claim 2, wherein the initial access priority order comprises a first group and a second group, and the sorter determines access orders of the requests in the first group and the second group according to the data amount signal.

7. The arbitration device of claim 1, wherein the sorter further assigns a highest access priority in the final access priority order to the one of the requests with a decompression process and a data buffer replenishing amount corresponding to the one of the requests that is smaller than a predetermined value.

8. The arbitration device of claim 1, further comprising an access controller coupled to the arbitrator for accessing a memory according to an output of the arbitrator.

9. The arbitration device of claim 8, wherein the access controller is a direct memory access (DMA) controller.

10. The arbitration device of claim 2, wherein the sorter receives an arbitration selection signal and selects an arbitration scheme for determining the final access priority order according to the arbitration selection signal.

11. A method for granting access to one of a plurality of circuits that issue a plurality of requests respectively, the method comprising:

receiving position information of an image signal, the position information output from the plurality of circuits;

determining an initial priority for each of the plurality of requests according to the position information;

determining a final priority for each of the plurality of requests after adjusting the initial priority order to accommodate at least one of data consumption speeds of each of the plurality of circuits and data buffer replenishing amounts corresponding to the plurality of requests; and granting access to one of the plurality of circuits according to at least one of the plurality of requests and the determined final priority.

12. The method of claim 11, further comprising the steps of:

receiving a data amount signal; and obtaining a data consumption status of the image layers according to the data amount signal, and adjusting the initial priority according to the data consumption status.

13. The method of claim 11, wherein the position information comprises coordinate information for indicating positions of the image layers in a current display frame.

14. The method of claim 13, wherein the priority comprises a plurality of groups and further comprising the step of:

sorting the requests to a first group and a second group of the plurality of groups according to the position information, wherein the requests in the first group correspond to the image layers in the current display frame;

wherein, if at least two of the requests are sorted to the first group and the second group respectively, the at least two of the requests in the first group and in the second group are assigned different access orders.

15. The method of claim 14, further comprising the step of determining access orders of the requests in the first group and the second group according to the data amount signal.

16. The method of claim 11, wherein the step of determining the priority comprises:

assigning the highest priority to one of the requests with a decompression processing and a data buffer replenishing amount corresponding to the one of the requests that is smaller than a predetermined value.

17. The method of claim 11, further comprising the step of providing an access controller for accessing a memory according to the at least one of the requests and the final priority.

18. The method of claim 17, wherein the access controller is a direct memory access (DMA) controller.

19. The method of claim 12, further comprising the steps of receiving an arbitration selection signal, and selecting an arbitration scheme to determine the final priority.

20. An apparatus comprising:

a plurality of circuits, each of the plurality of circuits outputting position information relating to data to be displayed on a display screen, and each of the plurality of circuits further outputting an access request;

a blending unit receiving the position information output from the plurality of circuits and outputting coordinate messages;

a sorter configured to receive the coordinate messages from the blending unit, the sorter further configured to determining an initial access priority order based on the position information, wherein the sorter determines a final access priority order by adjusting the initial access priority order to accommodate at least one of data consumption speeds of each of the plurality of circuits and data buffer replenishing amounts corresponding to the plurality of requests; and an arbitrator configured to receive the final access priority order and the requests from the plurality of circuits, the arbitrator being configured to grant access to one of the plurality of circuits based on the final access priority order.

* * * * *